(12) United States Patent
Willoughby et al.

(10) Patent No.: US 9,094,127 B2
(45) Date of Patent: Jul. 28, 2015

(54) OPTICAL REPEATER AMPLIFIER INSERTION AND REMOVAL TECHNOLOGY

(71) Applicant: Xtera Communications, Inc., Allen, TX (US)

(72) Inventors: Kevin Willoughby, Hertford (GB); John Durban, Colchester (GB); Adam Arnold, Westcliff (GB)

(73) Assignee: Xtera Communications, Inc., Allen, TX (US)

( * ) Notice: Subject to any disclaimer, the term of this patent is extended or adjusted under 35 U.S.C. 154(b) by 244 days.

(21) Appl. No.: 13/742,076

(22) Filed: Jan. 15, 2013

(65) Prior Publication Data

US 2014/0199083 A1    Jul. 17, 2014

(51) Int. Cl.
*G02B 6/00* (2006.01)
*H04B 10/29* (2013.01)
*G02B 6/44* (2006.01)

(52) U.S. Cl.
CPC .............. *H04B 10/29* (2013.01); *G02B 6/4448* (2013.01)

(58) Field of Classification Search
CPC .. G02B 6/4471; G02B 6/4452; G02B 6/3897; G02B 6/3887; G02B 6/3636
USPC .................................. 385/134, 135, 136, 137
See application file for complete search history.

(56) References Cited

U.S. PATENT DOCUMENTS

| 4,528,615 A | 7/1985 | Perry |
| 6,292,556 B1 | 9/2001 | Laetsch |
| 6,411,414 B1* | 6/2002 | Abate et al. .................... 398/182 |
| 8,849,122 B2* | 9/2014 | Brooks .......................... 398/115 |
| 2003/0048049 A1 | 3/2003 | Seal |

FOREIGN PATENT DOCUMENTS

DE    4207375 A1    9/1993

OTHER PUBLICATIONS

PCT/US2014/011593, Notification of Transmittal of the International Search Report and the Written Opinion of the International Searching Authority, or Declaration dated Apr. 7, 2014. (11 pages).

* cited by examiner

*Primary Examiner* — Jennifer Doan
(74) *Attorney, Agent, or Firm* — Workman Nydegger (57) ABSTRACT

A repeater amplifier assembly that includes at least two chassis containing optics and electronics. The chassis are connected with a size-adjustment mechanism that can adjust a size of the repeater amplifier assembly by reversibly adjusting the positions of the chassis with respect to each other. To insert the repeater amplifier assembly into a repeater housing, the repeater amplifier assembly is accessed in a contracted position. The amplifier is inserted into the housing, and then a control of the size adjustment mechanism is actuated to urge the chassis outwards until the chassis push against the repeater housing. To remove the repeater amplifier assembly from the repeater housing, the control is actuated to cause the size adjustment mechanism to pull the chassis inwards with respect to each other until the chassis no longer push against the repeater housing. The repeater amplifier assembly may then be freely removed from the repeater housing.

16 Claims, 7 Drawing Sheets

OPTICAL REPEATER AMPLIFIER INSERTION AND REMOVAL TECHNOLOGY

BACKGROUND

Fiber-optic communication networks serve a key demand of the information age by providing high-speed data between network nodes. Fiber-optic communication networks include an aggregation of interconnected fiber-optic links. Simply stated, a fiber-optic link involves an optical signal source that emits information in the form of light into an optical fiber. Due to principles of internal reflection, the optical signal propagates through the optical fiber until it is eventually received into an optical signal receiver. If the fiber-optic link is bi-directional, information may be optically communicated in reverse typically using a separate optical fiber.

Fiber-optic links are used in a wide variety of applications, each requiring different lengths of fiber-optic links. For instance, relatively short fiber-optic links may be used to communicate information between a computer and its proximate peripherals, or between a local video source (such as a DVD or DVR) and a television. On the opposite extreme, however, fiber-optic links may extend hundreds or even thousands of kilometers when the information is to be communicated between two network nodes.

Long-haul and ultra-long-haul optics refers to the transmission of light signals over long fiber-optic links on the order of hundreds or thousands of kilometers. Typically, long-haul optics involves the transmission of optical signals on separate channels over a single optical fiber, each channel corresponding to a distinct wavelength of light using principles of Wavelength Division Multiplexing (WDM) or Dense WDM (DWDM).

Transmission of optical signals over such long distances using WDM or DWDM presents enormous technical challenges, especially at high bit rates in the gigabits per second per channel range. Significant time and resources may be required for any improvement in the art of high speed long-haul and ultra-long-haul optical communication. Each improvement can represent a significant advance since such improvements often lead to the more widespread availability of communications throughout the globe. Thus, such advances may potentially accelerate humankind's ability to collaborate, learn, do business, and the like, with geographical location becoming less and less relevant.

Repeaters that include optical amplifiers are often used in order to extend the reach of fiber-optic links. Such optical amplifiers may include, for instance, rare-Earth doped fibers and semiconductor-based optical pumps that power the rare-Earth doped fibers. The repeaters therefore have a supply of electrical power, and drop power to the optical pumps. The repeaters also have heat dissipation characteristics which allow the heat generated by the repeater to be dissipated to the ambient environment. Repeaters are often situated underwater perhaps on the ocean floor when, for instance, they are used for trans-oceanic fiber-optic links. Such repeaters are termed "submarine" optical repeaters. In submarine repeaters, the heat is to be dissipated to the surrounding ocean, which is typically just several degrees Celsius at the depths that most submarine repeaters operate at.

Repeaters typically include a housing, an insulating layer, and the amplifier assembly itself. The cable includes optical fiber pairs (each pair having an eastern fiber for communication in one direction, and a western fiber for communication in the opposite direction). The cable also has a conductor for delivery of electrical power.

The housing is typically composed of metal and is actually in contact with the ambient environment (sea water in the case of a submarine repeater). The insulating layer is typically a polymeric sleeve and acts to electrically insulate the amplifier assembly from the housing. The polymeric sleeve is typically in good intimate contact with the housing. In order to efficiently transfer heat from the amplifier assembly to the ambient environment outside of the housing, the amplifier assembly should also have intimate contact with the polymeric sleeve. This promotes heat transfer from the amplifier assembly, through the polymeric sleeve, through the housing, and into the ambient environment. Amplifiers are typically inserted into housings and then forced out mechanically against the polymeric sleeve to create the intimate contact required to promote good heat transfer.

BRIEF SUMMARY

At least one embodiment described herein relates to a repeater amplifier assembly that includes at least two chassis containing optics and electronics. The chassis are connected with a size-adjustment mechanism that can adjust the size of the repeater amplifier assembly by reversibly adjusting the positions of the chassis with respect to each other. To insert the repeater amplifier assembly into a repeater housing, the repeater amplifier assembly is accessed in a contracted position. The amplifier is inserted into the housing, and then a control of the size adjustment mechanism is actuated to urge the chassis outwards with respect to each other to cause the chassis to push against the polymeric sleeve and housing. To remove the repeater amplifier assembly from the repeater housing, the control is actuated to cause the size adjustment mechanism to pull the chassis inwards with respect to each other until the chassis no longer push against the polymeric sleeve and repeater housing. The repeater amplifier assembly may then be freely removed from the repeater housing. In some embodiments, the control may be used to actuate multiple instances of the repeater amplifier assembly, each having a corresponding size-adjustment mechanism.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a repeater amplifier assembly has an adjustable size that may be manipulated to allow for more convenient assembly and maintenance of a repeater. The repeater amplifier assembly includes at least two chassis containing optics and electronics. The chassis are connected with a size-adjustment mechanism that can adjust a size of the repeater amplifier assembly by reversibly adjusting the positions of the chassis with respect to each other. To insert the repeater amplifier assembly into a repeater housing during assembly or to complete maintenance, the repeater amplifier assembly is accessed in a contracted position. The amplifier is inserted into the housing, and then a control of the size adjustment mechanism is actuated to urge the chassis outwards with respect to each other causing the chassis to push against the liner and repeater housing. To remove the repeater amplifier assembly from the repeater housing to initiate maintenance, the control is actuated to cause the size adjustment mechanism to pull the chassis inwards with respect to each other until the chassis no longer push against the liner and repeater housing. The repeater amplifier assembly may then be freely removed from the repeater housing.

Although the principles described herein are not limited to embodiments that have the advantages that will now be described, some embodiments allow the outward force of the chassis to be sufficient to cause the chassis to make intimate contact with the repeater housing. This provides an efficient thermal channel for dissipating heat from the optics and electronics on the chassis through the housing. In the case of a submarine repeater, the cold ocean would serve as an effective heat sink in that case.

Furthermore, although the broadest principles described herein are not limited to this particular embodiment, some embodiments described herein allow the outward force of the chassis to be tunable. For instance, the outward force should be above a certain threshold that will 1) allow the intimate contact between the chassis and housing to allow for efficient heat dissipation from the optics and electronics into the ambient environment, and 2) allow the chassis to be fixed in position despite all the realistically anticipated forces that could be applied to the repeater amplifier assembly. For instance, a submarine amplifier assembly may experience acceleration and sudden movement when deployed from a ship onto the ocean floor, and when being retrieved in the opposite direction. Some embodiments described herein allow for the tuned force to be relatively constant over time. Thus, for example, when the submarine repeater amplifier assembly is later retrieved, the chassis remains fixed within the repeater housing. The tunable outward force is above this minimum threshold, but also may be tuned to be below a maximum threshold in which the outward force risks damage to the repeater components. Thus, the tunable force may be adjusted to be safely between the minimum and maximum thresholds.

First, a repeatered optical environment will first be described with respect to FIG. 1. Then, embodiments of a repeater optical assembly and corresponding repeater will be described with respect to subsequent figures.

Figure 1:
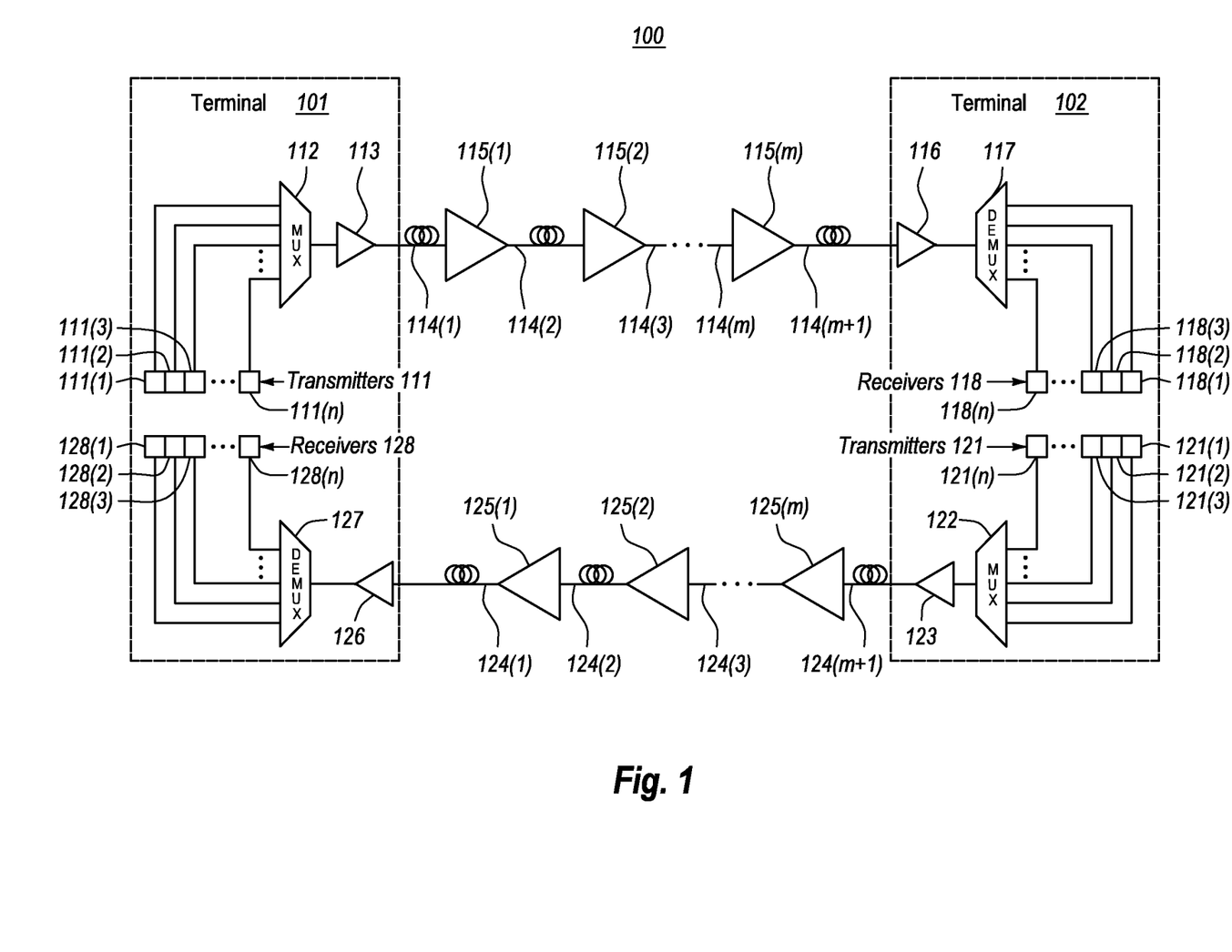
FIG. 1 schematically illustrates an example optical communications system in which the principles described herein may be employed.

FIG. 1 schematically illustrates an example optical communications system 100 in which the principles described herein may be employed. In the optical communications system 100, information is communicated between terminals 101 and 102 via the use of optical signals. For purposes of convention used within this application, optical signals travelling from the terminal 101 to terminal 102 will be referred to as being "eastern", whereas optical signals traveling from the terminal 102 to the terminal 101 will be referred to as being "western". The terms "eastern" and "western" are simply terms of art used to allow for easy distinction between the two optical signals travelling in opposite directions. The use of the terms "eastern" and "western" does not imply any actual geographical relation of components in FIG. 1, nor to any actual physical direction of optical signals. For instance, terminal 101 may be geographical located eastward of the terminal 102, even though the convention used herein has "eastern" optical signals traveling from the terminal 101 to the terminal 102.

In one embodiment, the optical signals are Wavelength Division Multiplexed (WDM) and potentially Dense Wavelength Division Multiplexed (DWDM). In WDM or DWDM, information is communicated over each of multiple distinct optical channels called hereinafter "optical wavelength channels". Each optical wavelength channel is allocated a particular frequency for optical communication. Signals that fall within the particular frequency will be referred to as respective optical wavelength signals. Accordingly, in order to communicate using WDM or DWDM optical signals, the terminal 101 may have "n" optical transmitters 111 (including optical transmitters 111(1) through 111(n), where n is a positive integer), each optical transmitter for transmitting over a corresponding eastern optical wavelength channel. Likewise, the terminal 102 may have "n" optical transmitters 121 including optical transmitters 121(1) through 121(n), each also for transmitting over a corresponding western optical wavelength channel. The principles described herein are not limited, however, to communications in which the number of eastern optical wavelength channels is the same as the number of western optical wavelength channels. Furthermore, the principles described herein are not limited to the precise structure of the each of the optical transmitters. However, lasers are an appropriate optical transmitter for transmitting at a particular frequency. The optical transmitters may be tunable within a frequency range.

As for the eastern channel for optical transmission in the eastern direction, the terminal 101 multiplexes each of the eastern optical wavelength signals from the optical transmitters 111 into a single eastern optical signal using optical multiplexer 112, which may then be optically amplified by an optional eastern optical amplifier 113 prior to being transmitted onto a first optical fiber link 114(1).

There are a total of "m" repeaters (labeled 115 for the eastern repeaters and 125 for the western repeaters) and "m+1" optical fiber links (labeled 114 for the eastern fiber links and 124 for the western fiber links) between the terminals 101 and 102 in each of the eastern and western channels. However, there is no requirement for the number of repeaters in each of the eastern and western channels to be equal. Each of the repeaters may consume electrical power to thereby amplify the optical signals.

The eastern optical signal from the final optical fiber link 114(m+1) is then optionally amplified at the terminal 102 by an optional optical amplifier 116. The eastern optical signal is then demultiplexed into the various wavelength optical wavelength channels using optical demultiplexer 117. The various optical wavelength channels may then be received and processed by corresponding optical receivers 118 including optical receivers 118(1) through 118(n).

As for the western channel for optical transmission in the western direction, the terminal 102 multiplexes each of the western optical wavelength signals from the optical transmitters 121 (including optical transmitters 121(1) through 121(n)) into a single western optical signal using the optical multiplexer 122. The multiplexed optical signal may then be optically amplified by an optional western optical amplifier 123 prior to being transmitted onto a first optical fiber link 124(m+1). If the western optical channel is symmetric with the eastern optical channel, there are once again "m" repeaters 125 (labeled 125(1) through 125(m)), and "m+1" optical fiber links 124 (labeled 124(1) through 124(m+1)).

The western optical signal from the final optical fiber link 124(1) is then optionally amplified at the terminal 101 by the optional optical amplifier 126. The western optical signal is then demultiplexed using optical demultiplexer 127, whereupon the individual wavelength division optical channels are received and processed by the optical receivers 128 (including optical receivers 128(1) through 128(n)). Terminals 101 and/or 102 do not require all the elements shown in optical communications system 100. For example, optical amplifiers 113, 116, 123, and/or 126 might not be used in some configurations. Furthermore, if present, each of the corresponding optical amplifiers 113, 116, 123 and/or 126 may be a combination of multiple optical amplifiers if desired.

Often, the optical path length between repeaters is approximately the same. The distance between repeaters will depend on the total terminal-to-terminal optical path distance, the data rate, the quality of the optical fiber, the loss-characteristics of the fiber, the number of repeaters (if any), the amount of electrical power deliverable to each repeater (if there are repeaters), and so forth. However, a typical optical path length between repeaters (or from terminal to terminal in an unrepeatered system) for high-quality single mode fiber might be about 50 kilometers, and in practice may range from 30 kilometers or less to 100 kilometers or more. That said, the principles described herein are not limited to any particular optical path distances between repeaters, nor are they limited to repeater systems in which the optical path distances are the same from one repeatered segment to the next.

The optical communications system 100 is represented in simplified form for purpose of illustration and example only. The principles described herein may extend to much more complex optical communications systems. The principles described herein may apply to optical communication systems in which there are multiple fiber pairs, each for communicating multiplexed WDM optical signals. Furthermore, the principles described herein also apply to optical communications in which there are one or more branching nodes that split one or more fiber pairs and/or optical wavelength channels in one direction, and one or more fiber pairs and/or optical wavelength channels in another direction.

Figure 2:
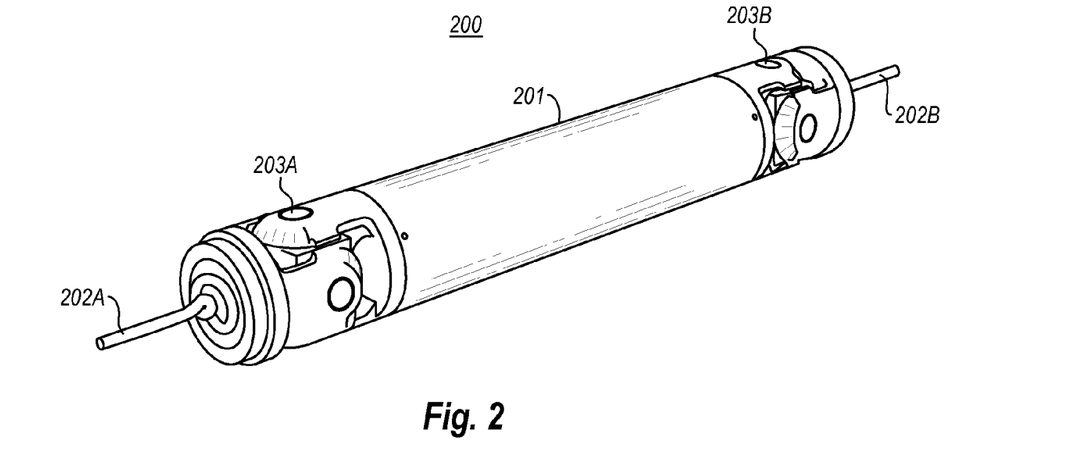
FIG. 2 illustrates a perspective view an example embodiment of an optical repeater.

FIG. 2 illustrates a perspective view an example embodiment of an optical repeater 200. The optical repeater 200 may perform amplification for one or more fiber pairs. In one specific embodiment, the optical repeater 200 performs amplification for multiple fiber pairs. Each fiber pair includes a fiber for an eastern channel, and a fiber for a western channel. In FIG. 1, for example, only one eastern channel is illustrated (comprising optical fiber links 114(1) through 114(m+1) and repeaters 115(1) through 115(m)), and only one western channel is illustrated (comprising optical fiber links 124(1) through 124(m+1) and repeaters 125(1) through 125(m)). However, in actual operation, there may be multiple eastern optical channels, and multiple western optical channels.

For one fiber pair, the optical repeater 200 may serve as any of the illustrated eastern repeaters 115(y) where "y" is any integer between 1 and the total number of eastern repeaters 115, and the optical repeater 200 may also serve as any of the illustrated western repeaters 125(z) where "z"='y'. However, for each additional fiber pair that is served by the optical repeater 200, the optical repeater acts as an eastern repeater for another eastern optical channel (not illustrated in FIG. 1) and a western repeater for another western optical channel (not illustrated in FIG. 1).

The optical repeater 200 that is illustrated is just one example of a limitless variety of optical repeaters that may benefit from the broader principles described herein. Regardless of the shape or configuration of the optical repeater, the principles described herein allow the size of the repeater amplifier assembly to be adjusted so that a repeater amplifier assembly may be more easily removed from and inserted into the housing of the optical repeater. Nevertheless, the optical repeater 200 is an example that will now be described in further detail with respect to subsequent figures.

The optical repeater 200 houses optical amplifiers inside a repeater housing 201. In the illustrated example, the repeater housing 201 is cylindrical, although the principles described herein are not limited to that shape of repeater housing. In the illustrated example, the optical repeater 200 is a submarine repeater, though the principles described herein may also apply to terrestrial repeaters well. The repeater amplifier assembly includes the amplifiers themselves. As an example, the amplifiers may include rare earth element doped fibers together with powered semiconductor based optical pumps. The repeater housing 201 may be, for example, a metallic sea case that actually contacts the ambient ocean during operation.

A cable is connected to each end of the optical repeater. The cable includes an electrical conductor for providing electrical power to and from the optical repeater 200, and also includes two optical fibers for each fiber pair supported by the optical repeater. For instance, in FIG. 2, the cable itself is not shown. However, a tail tube 202A is attached at one end of the optical repeater 200 (hereinafter also referred to as the "close end") and connects the electrical conductor and optical fibers at that one end. In addition, another tail tube 202B is attached at the other end of the optical repeater 200 (hereinafter also referred to as the "far end") and connects the electrical conductor and optical fibers at the other end.

A bending-limiting device 203A is fitted to the close end of the repeater housing 201 and supports and guides the tail tube 202A. Likewise, a similar bend-limiting device 203B is fitted to the far end of the repeater housing 201 and supports and guides tail tube 202B. Examples of a suitable bend-limiting devices are gimbals although the principles describe herein are not limited to the use of gimbals. The bend-limiting devices 203A and 203B limit the maximum bend seen by the tail tubes during deployment and recovery and the optical repeater 200, and allows the optical repeater 200 to articulate around a cable ship bow sheave. Each tail tube 202A and 202B is spliced to the cable and the resultant joint secured to the outboard end of the bend-limiting device.

Figure 3:
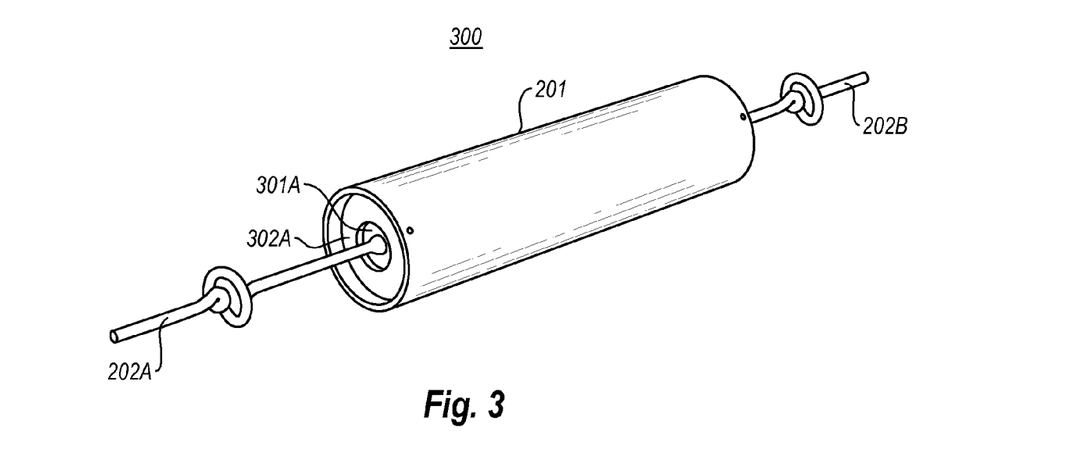
FIG. 3 illustrates a perspective view of the optical repeater of FIG. 2, except with the bend limiting devices not shown so that several underlying components may be made visible.

FIG. 3 illustrates a perspective view 300 of the optical repeater 200 of FIG. 2, except with the bend limiting devices 203A and 203B not shown so that several underlying components may be made visible. As more apparent from FIG. 3, each end of the repeater housing 201 is sealed hermetically with a bulkhead 301A which is held in place by a retaining ring 302A. The sealing system is also designed to withstand hydrostatic pressure associated with deploying to water depths of up to 8 km. The perspective view of FIG. 3 shows this most clearly for the close end of the repeater housing 201, but a similar bulkhead and retaining ring may be present at the far end of the repeater housing 201 as well.

Figure 4:
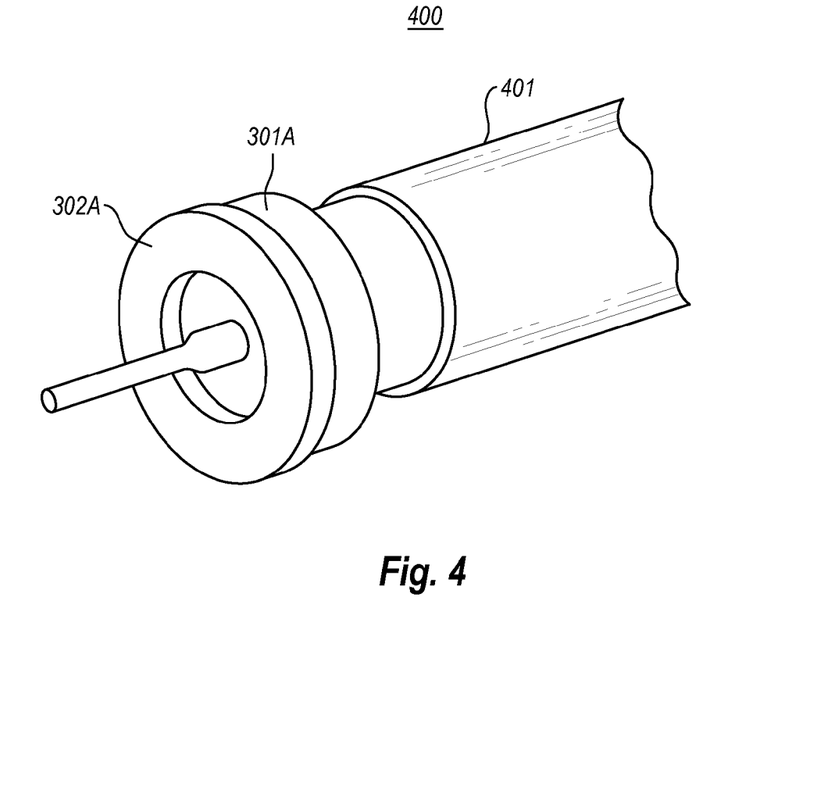
FIG. 4 illustrates a perspective view of the optical repeater of FIG. 2, except now with the bend limiting device and the housing not shown, so as to expose a liner.

FIG. 4 illustrates a perspective view 400 of the close end of the optical repeater 200 of FIG. 2, except now with the bend-limiting device 203A and the repeater housing 201 not shown, so as to expose a close end of a liner 401. The repeater amplifier assembly (not shown in FIG. 4, but shown more completely in FIG. 5), is contained within the liner 401. The liner 401 serves as electrical isolation between the repeater amplifier assembly and the repeater housing 201.

Recall that the optical amplifiers and optical pumps of the optical repeater are mounted within the repeater amplifier assembly. Accordingly, the repeater amplifier assembly generates heat. In order to maintain heat transfer between the optical amplifiers, the repeater housing 201, and ultimately the ocean, an intimate contact is best between the repeater amplifier assembly and the liner 401. However, if the contact is very intimate, there will not be enough clearance between the repeater amplifier assembly and the liner 401 in order to facilitate assembly. The principles described herein solve these seemingly contradictory purposes by providing a repeater amplifier assembly that contracts and expands as desired. During assembly, when the repeater amplifier assembly is being inserted into the repeater housing, the repeater amplifier assembly may be in the contracted position to allow a clearance to freely insert the repeater amplifier assembly. Thus, once in position, the repeater amplifier assembly may be expanded to form the intimate contact with the liner. In some embodiments described herein, this expansive outward force is made to be tunable. When and if the optical repeater is later accessed for maintenance, the repeater amplifier assembly may be removed from the repeater housing by contracting the repeater amplifier assembly thereby forming the small clearance with the repeater housing, and thus facilitating removal of the repeater amplifier assembly from the repeater housing.

Figure 5:
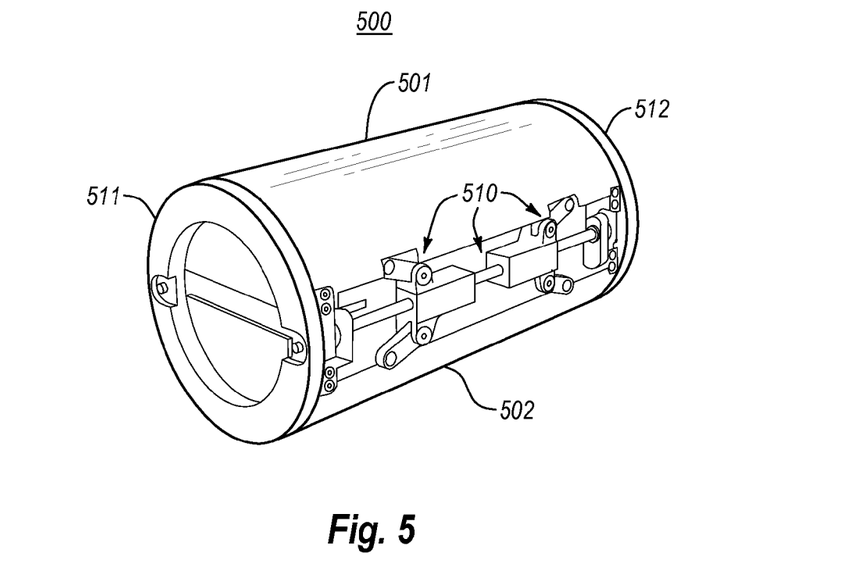
FIG. 5 illustrates a perspective view of a repeater amplifier assembly that represents but one specific example of how a contractible and expandable repeater amplifier assembly may be formed.

FIG. 5 illustrates a perspective view of a repeater amplifier assembly 500 that represents but one specific example of how such a contractible and expandable assembly may be formed. Specifically, the repeater amplifier assembly 500 is suitable for a cylindrical housing and liner. However, other shapes of repeater amplifier assemblies may likewise be used for other repeater housing shapes, consistent with the principles described herein.

There may be multiple repeater amplifier assemblies 500 stacked end-to-end lengthwise within the liner 401, although the liner 401 may also just contain one such repeater amplifier assembly 500. FIG. 5 illustrates just one repeater amplifier assembly 500. In any case, the repeater housing 201 would be long enough to house the desired number of repeater amplifier assemblies.

Each repeater amplifier assembly 500 includes two chassis 501 and 502. A size adjustment mechanism 510 connects the chassis 501 and 502, and is configured to adjust a size of the repeater amplifier assembly 500 by reversibly adjusting a position of the chassis 501 with respect to the chassis 502. The size adjustment mechanism 510 includes a control that allows the repeater amplifier assembly to be reversibly positioned in an expanded position in which the chassis 501 and 502 are pushed outward from each other, or a contracted position in which the chassis 501 and 502 are pulled inward towards each other. An example of this control will be described further below with respect to FIG. 6A and FIG. 6B.

The chassis 501 includes optics and electronics such as, for example, the optics and electronics for at least one fiber pair. The chassis 502 also includes optics and electronics such as, for example, the optics and electronics for at least another fiber pair. Such optics and electronics might include, for example, the doped fiber amplifiers and electrically-powered pumps to. In the illustrated case, the chassis 501 and 502 each have an outward facing surface that is shaped as a length-wise portion (half) of a cylinder. This is suitable for a repeater housing that is cylindrically-shaped as such a surface would maintain intimate contact with such a repeater housing when the repeater amplifier assembly is inserted into the repeater housing and expanded. However, other shapes of chassis may be suitable to maintain intimate contact with other forms of repeater housing, consistent with the general principles described herein.

Figure 6A:
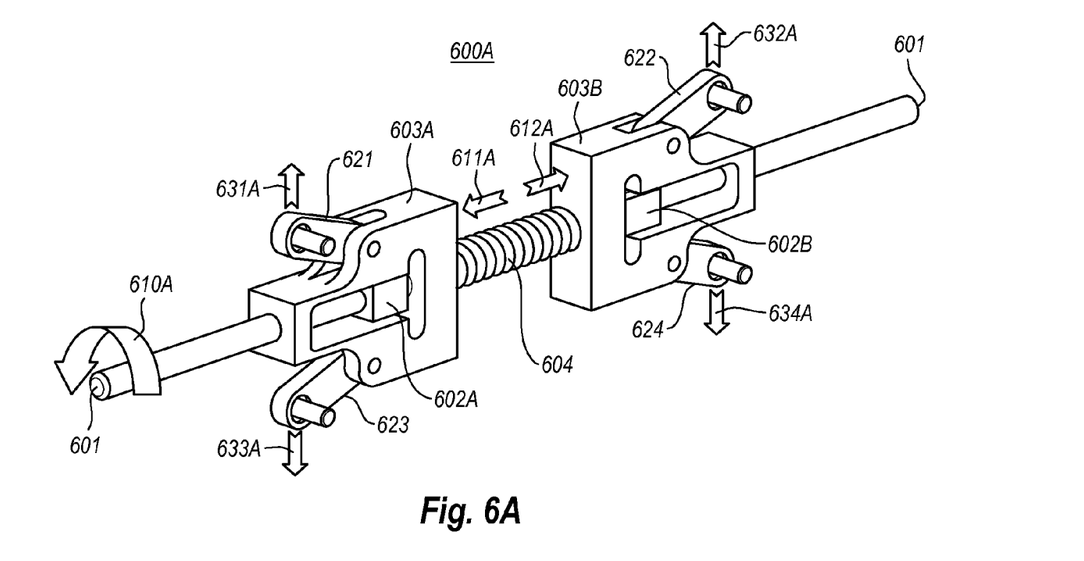
FIG. 6A illustrates a perspective close-up view on the size adjustment mechanism of FIG. 5 being urged to expand.
Figure 6B:
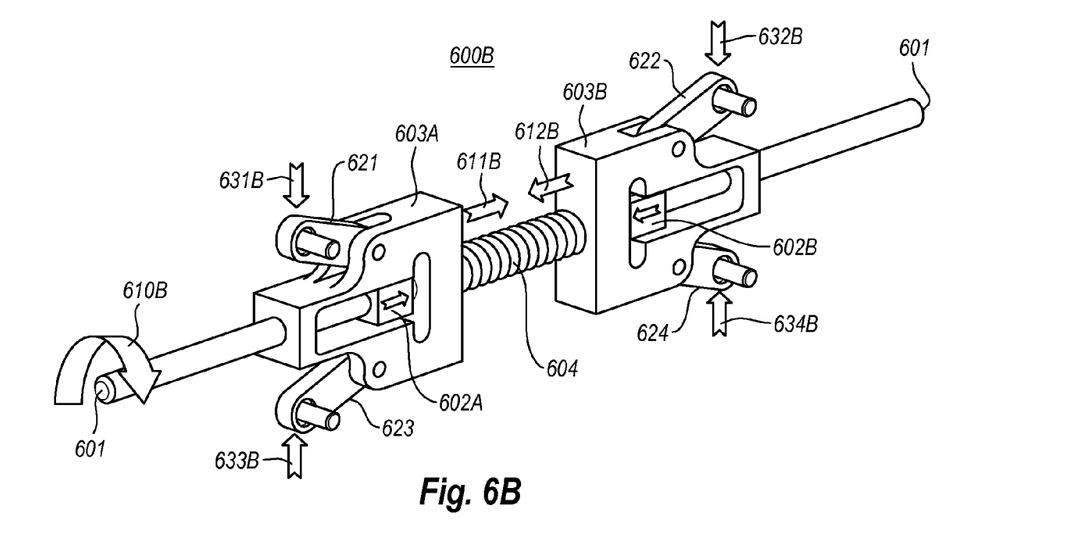
FIG. 6B illustrates a perspective close-up view on the size adjustment mechanism of FIG. 5 being urged to contract.

The size adjustment mechanism 510 is designed to produce an outward force which maintains the intimate contact between the outer surface of the chassis 501 and 502 and the liner 401. This outward force is generated by an assembly of springs and linkages as shown in FIGS. 6A and 6B. There is a size adjustment mechanism 510 on both sides of the repeater amplifier assembly 500, connecting the chassis 501 and 502 at two locations. End pieces 511 and 512 cap the chassis 501 and 502 so that when the chassis 501 and 502 move relative to each other the chassis 501 and 502 do expand outward with respect to the central axis of the cylinder defined by the repeater housing 201, the liner 401, and the repeater amplifier assembly 500.

As will be explained, the springs or other resilient compression mechanism produce a load on reaction blocks which forces the reaction blocks apart. Link arms transfer this load to the chassis, pushing the chassis outwards. The applied outward force is maintained over time to a level that allows the intimate contact to be maintained until the optical repeater is next maintained or until the optical repeater reaches its end of lifetime. As an example, the outward force may be maintained consistently over time, so that it does not significantly relax over time. Furthermore, the outward force may be made to be tunable.

FIG. 6A illustrates a perspective close-up view on the size adjustment mechanism 510 in an expanding state 600A. FIG. 6B illustrates a perspective close-up view on the size adjustment mechanism 510 in contracting state 600B.

The size adjustment mechanism 510 includes a guide rod 601 that is left hand threaded on one end, and right hand threaded at the other end. One guide piece 602A is threaded on the left hand threaded portion, and a guide piece 602B is threaded on the right hand threaded portion. Furthermore, the size adjustment mechanism 510 includes a mechanism for permitting the guide rod 601 to be rotated with respect to the guide pieces 602A and 602B.

For instance, the size adjustment mechanism 510 includes reaction block 603A slidably coupled to the guide rod 601, and another reaction block 603B slidably coupled to the guide rod 601. The size adjustment mechanism 510 also includes a resilient compression mechanism 604 coupled to urge the reaction blocks 603A and 603B apart along the guide rod 601. For instance, the resilient compression mechanism 604 may be a spring positioned on the guide rod 601 between the reaction blocks 603A and 603B.

In one embodiment, the resilience compression mechanism 604 is a series of stacked disk springs and perhaps spacers. In this case, the level of push-out force can be varied by altering the geometry of the mechanism and characteristics/arrangement of the springs. The springs can be selected to achieve a force that is suitable for requirements such as optimal thermal contact and secure axial location/retention of the repeater amplifier assembly within the housing (e.g., which could be a sea case if deployed in a submarine repeater).

Since the push-out force is governed by the size adjustment mechanism, and more specifically the springs, the push out force is not sensitive to the operator variance or error during assembly that may occur with a rigid push-out system that jacks the chassis outwards until, perhaps, a torque limit is reached. The forces that are exerted by the size adjustment mechanism can be pre-set by careful engineering of geometry and selection of the springs' physical parameters. A reliable, repeatable, level of force can therefore be pre-determined.

The repeater amplifier assembly allows for small dimensional variances in housing internal diameter from one repeater to another due to normal manufacturing tolerances. Exerting a force by means of springs results in a mechanism that will self-adjust to the internal diameter of the liner. In additional during the repeaters lifetime small diametrical dimensional changes may occur as a consequence of phenomena such as thermal expansion, hydrostatic compression and material creep. The spring forces are broadly linear over the small movement range and so the internal unit is able to self-adjust whilst delivering a relatively constant push-out force, thereby providing a significant improvement to the art of optical repeaters.

In its resting, de-housed, state the springs push the chassis apart to an extent that prevents assembly of the internal unit into the housing. In order to perform this assembly, the chassis can be moved closer together so that the repeater amplifier assembly will loosely fit within the inner diameter of the liner. Once the repeater amplifier assembly is in place the push-out function is activated to create the contact between chassis and housing liner. An example operation of the mechanism will now be described.

The size adjustment mechanism 510 also includes a force transfer mechanism configured to transfer output pressure on the chassis 501 and 502 when the reaction blocks 603A and 603B are moved further apart along the guide rod 601. An example of such a force transfer mechanism is link arms 621 through 624. Link arm 621 is coupled between the reaction block 603A and the chassis 501. Link arm is coupled between the reaction block 603B and the chassis 501. Link arm 623 is coupled between the reaction block 603A and the chassis 502. Link arm 624 is coupled between the reaction block 603B and the chassis 502. With the guide rod 601 rotatably coupled to the end pieces 511 and 512, and with the size adjustment mechanism 510 configured as shown and described with respect to FIGS. 6A and 6B, the guide rod 601 may be rotated with respect to the guide pieces 602A and 602B since the guide pieces 602A and 602B are held by the respective reaction blocks 603A and 603B.

In this state, when the guide rod 601 is rotated in a first direction (in a direction 610B in FIG. 6B), contraction of the repeater amplifier assembly 500 occurs. Specifically, since the guide rod 601 is left hand threaded on one end, and right hand threaded on the other, rotating the guide rod 601 in direction 610B causes the guide pieces 602A and 602B to move closer together along the guide rod 601 as indicated by arrows 611B and 612B in FIG. 6B.

The guide piece 602A thus pushes the reaction block 603A against the resilient compression mechanism 604, and the guide piece 602B thus pushes the reaction block 603B against the resilient compression mechanism 604. This forces the reaction blocks 603A and 603B to slide closer together along the guide rod 601 and compress the resilient compression mechanism 604. With the reaction blocks 603A and 603B moving closer together, the force transfer mechanism thus pulls inward on the chassis 501 and 502. For instance, link arms 621 through 624 pull inwards on the chassis 501 and 502 are represented by the arrows 631B, 632B, 633B and 634B, thereby causing a contracting action of the repeater amplifier assembly. As the torque applied to the guide rod 601 is increased along direction 610B, the repeater amplifier assembly 500 collapses to a state where it can be inserted into the repeater housing 201 (or more specifically, into the liner 401 set within the repeater housing 201). In one embodiment, when the guide pieces 602A and 602B move closer together along the guide rod to beyond a certain point, the reaction blocks 603A and 603B are locked in position so that no externally applied rotational force need be applied to the guide rod in order to keep the first and second reaction blocks in place.

After insertion of the repeater amplifier assembly 500 into the repeater housing 201, the guide rod 601 may be rotated in the opposite direction 610A as illustrated in FIG. 6A. This causes the guide pieces 602A and 602B to move further apart along the guide rod 601. Due to the force of the resilient compression mechanism 604, this also causes the reaction blocks 603A and 603B to move further apart along the guide rod 601. Here, a force transfer mechanism is configured to transfer outward pressure on the chassis 501 and 502 when the reaction blocks 603A and 603B are moved further apart along the guide rod 601. Specifically, since the guide rod 601 is left hand threaded on one end, and right hand threaded on the other, rotating the guide rod 601 in direction 610A causes the guide pieces 602A and 602B to move farther apart along the guide rod 601 as indicated by arrows 611A and 612A in FIG. 6B. This, in turn, causes the link arms 621, 622, 623 and 624 to apply forces in the direction represented by arrows 631A, 632A, 633A and 634A, respectively.

Thus, as guide rod 601 is rotated along direction 610A, the repeater amplifier assembly 500 expands. Once the chassis 501 and 502 have reached the liner 401, continued rotation causes the guide rod 601 and captive guide pieces 602A and 602B to become loose. The outward load is then fully controlled by the resilient compression mechanism 604. Although the principles described herein are not limited to embodiments that have the advantages that have been described, some embodiments allow the outward force of the chassis to be sufficient to cause the chassis to make intimate contact with the repeater housing. This provides an efficient thermal channel for dissipating heat from the optics and electronics on the chassis through the housing. In the case of a submarine repeater, the cold ocean would serve as an effective heat sink in that case.

On the other hand, if the repeater amplifier assembly was not inserted into the repeater housing 201, then rotation in direction 610A would ultimately push the chassis 501 and 502 apart to an extent that prevents assembly of the repeater amplifier assembly 500 into the repeater housing 201. Thus, in that state, the repeater amplifier assembly 500 would be contracted in order to insert into the repeater housing 201.

The principles described herein are not limited to the form of the repeater amplifier assembly. The principles described herein are also not limited to the manner or mechanism used to expand and contract the repeater amplifier assembly. Nevertheless, the repeater amplifier assembly has some type of control that allows the repeater amplifier assembly to be reversibly positioned in an expanded position in which the chassis are pushed outward from each other, or a contracted position in which the chassis are pulled inward towards each other. In the example of FIGS. 2, 3, 4, 5, 6A and 6B, an example of this control is the rotation of the guide rod 601.

Figure 7:
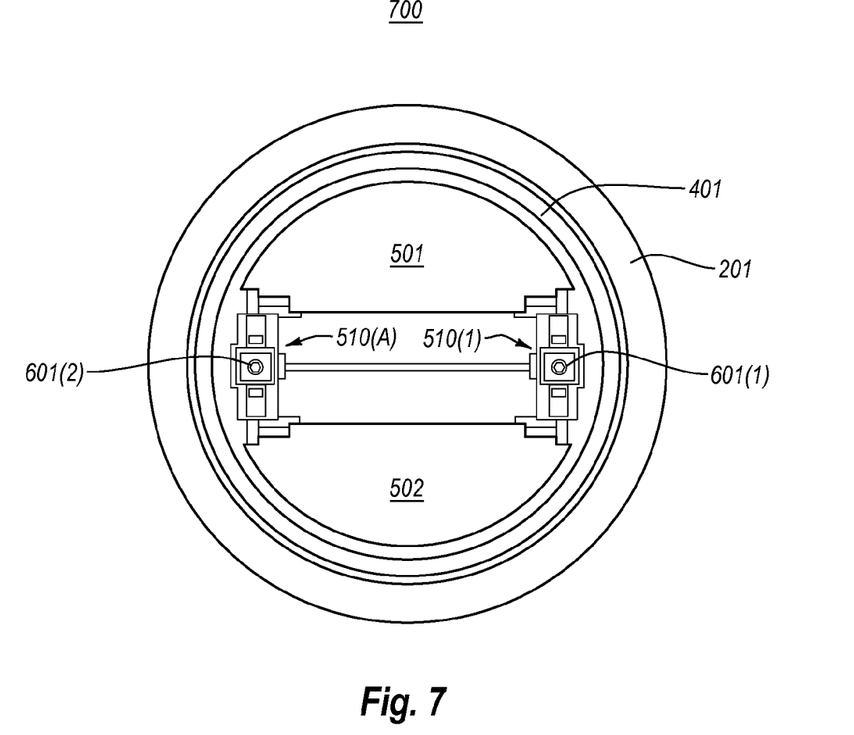
FIG. 7 illustrates a cross-sectional view of the repeater amplifier assembly of FIG. 5 within the housing of FIG. 2.

FIG. 7 illustrates a cross-sectional view 700 of the repeater amplifier assembly 500 of FIG. 5 within the housing 201 of FIG. 2. For optimum performance in this application, the axes of the guide rods 601(1) and 601(2) and the repeater amplifier assembly 500 are coplanar. Furthermore, the size adjustment mechanisms 510(1) and 510(2) are located symmetrically about the axis of the repeater amplifier assembly 500.

End plate devices are used to control the co-planarity of the guide rods 601(1) and 602(2). They also serve to restrict the amount of internal unit compression and expansion around the nominal 'steady-state' diameter which is the same as the inner diameter of the liner 401. Restriction of expansion only applies when the repeater amplifier assembly 500 is de-housed. When housed inside the housing (e.g., a sea case if a submarine repeater), the liner 401 acts as the expansion limiter. The final function of the end plate devices is to ensure that the end faces of chassis 501 and 502 remain coplanar. Without the end plates, very small imbalances in the mechanism would tend to distort the repeater amplifier assembly into a trapezoidal shape and prevent correct operation.

Figure 8A:
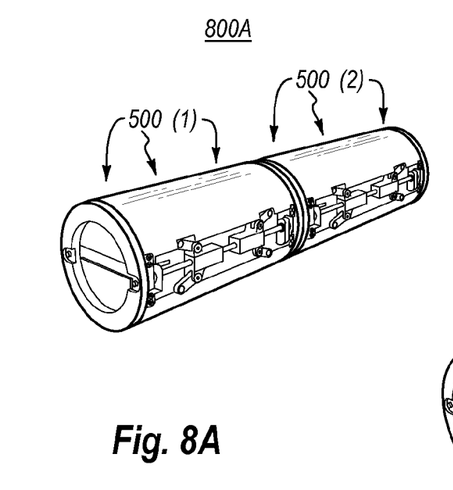
FIG. 8A illustrates a perspective view of a series of two concatenated repeater amplifier assemblies of FIG. 5.
Figure 8B:
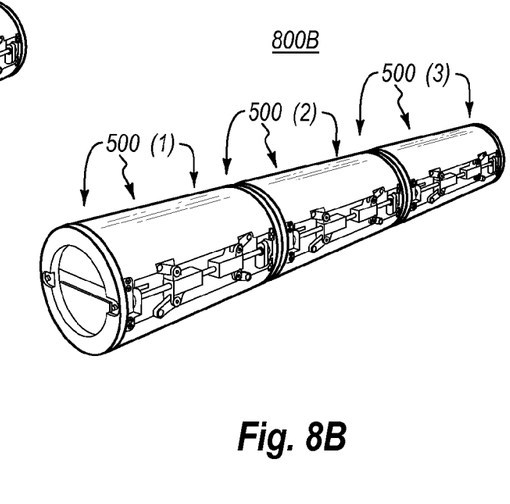
FIG. 8B illustrates a perspective view of a series of three concatenated repeater amplifier assemblies of FIG. 5.

In one embodiment, each chassis 501 or 502 is capable of handling the optical functions for a single fiber pair. In that case, the repeater amplifier assembly 500, having two chassis 501 and 502, handles optical functions for two fiber pairs. However, the design may be expanded to handle more fiber pairs by, for example, including the optical functioning for more than one fiber pair in each chassis 501 and 502, or (as will now be described) concatenating multiple instances of the repeater amplifier assembly 500 together. For instance, FIG. 8A illustrates a series assembly 800A of two concatenated instances 500(1) and 500(2) of the repeater amplifier assembly 500 of FIG. 5. FIG. 8B illustrates a series assembly 800B of three concatenated instances 500(1), 500(2) and 500(3) of the repeater amplifier assembly 500 of FIG. 5. Referring to FIG. 2, the design of the housing 201 would be lengthened to accommodate the increased length of the concatenated series 800A and 800B. The principles may be further extended to concatenations of more than three repeater amplifier assemblies as well.

For a four fiber pair assembly (involving a series 800A of two concatenated repeater amplifier assemblies 500(1) and 500(2)), the actuation of the size adjustment mechanisms could be achieved by accessing the first repeater amplifier assembly 500(1) from one end of the housing 201 and then the second repeater amplifier assembly 500(2) from the other end of the housing 201. However this principle does not extend to an internal unit of five or more fiber pairs (a series 800B of three concatenated repeater amplifier assemblies 500(1), 500(2) and 500(3)) as the design would not allow for actuation of the central repeater amplifier assembly 500(2) of FIG. 8B unless the rotation of their guide rods were to be driven by a connection to an adjacent repeater amplifier assembly 500(1) or 500(3) of FIG. 8B. This connection should allow for some independent axial movement in the rods whilst maintaining secure rotational connectivity.

Figure 9:
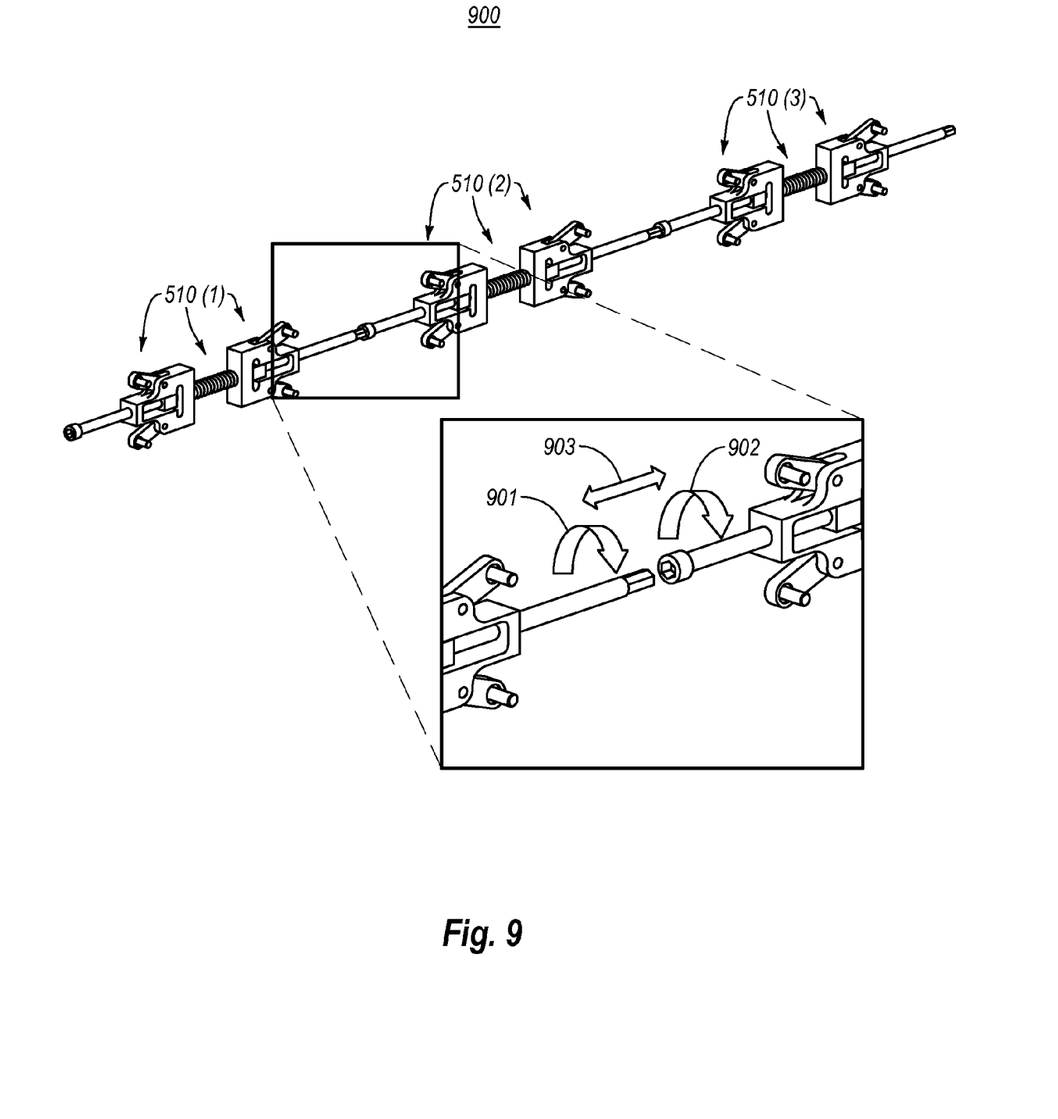
FIG. 9 illustrates a length of three size adjustment mechanisms of the series of FIG. 8B, showing further in expanded view a possible connection between adjacent size adjustment mechanisms.

FIG. 9 illustrates a structure 900 that would allow this. Here, one of the size adjustment mechanisms 510(1), 510(2) and 510(3) for each of the corresponding repeater amplifier assemblies 500(1), 500(2) and 500(3) of the series 800B of FIG. 8B are shown. As shown in the expanded view, the connection between the size adjustment mechanism 510(1) and 510(2) is shown. The guide rod of the size adjustment mechanism 510(1) has a hex drive at its end that may be received into and removed from (as represented by arrow 903) a hex socket within the opposing end of the next guide rod of the next size adjustment mechanism 510(2). Then movement (as represented by arrow 901) of the guide rod of the size adjustment mechanism 510(1) will cause a corresponding movement (as represented by arrow 902) of the guide rod of the next size adjustment mechanism 510(2). All three repeater amplifier assemblies 500(1), 500(2) and 500(3) of the series 800B of FIG. 8B could follow this connection philosophy and this would allow the actuation of a series of size adjustment mechanisms from one end of the housing 201 only. This principle may be extended to series of four or more concatenated repeater amplifier assemblies also.

The series should be completed with each mechanism in a compressed state (i.e., with captive guide blocks in contact with reaction blocks). The nominal compression level should be the same for all repeater amplifier assemblies but tolerances will dictate some variability in the level of compression. There should be sufficient travel to further compress the repeater amplifier assembly chain to facilitate assembly into the housing.

After insertion, the guide rods are rotated to transfer load control to the resilient compression mechanism. Each repeater amplifier assembly will then move to achieve its fully pushed out position. For instance, in the case of FIG. 8B, one repeater amplifier assembly will achieve push-out, then the second repeater amplifier assembly, and then the third repeater amplifier assembly before the guide rods become slack. The exact order depends on part and assembly tolerances. It is likely to vary from repeater to repeater but will not affect functionality.

Figure 10:
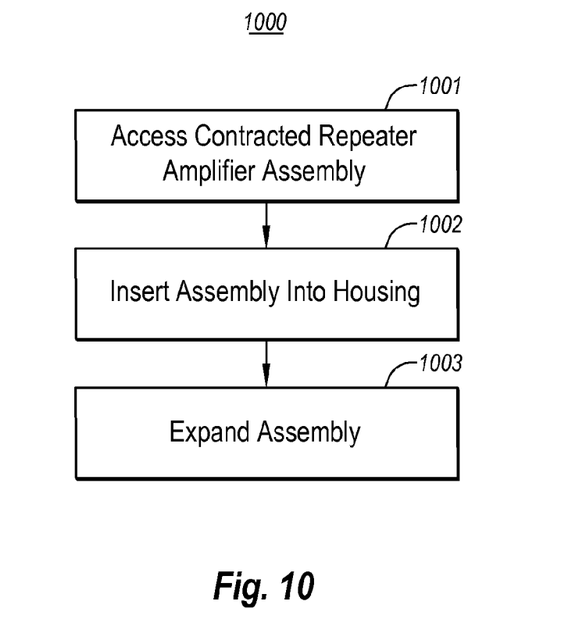
FIG. 10 illustrates a flowchart of a method for inserting a repeater amplifier assembly into a repeater housing.

FIG. 10 illustrates a flowchart of a method 1000 for inserting a repeater amplifier assembly into a repeater housing. As an example only, the method 1000 may be performed in inserting the repeater amplifier assembly 500 into the repeater housing 201. Thus, the method 1000 will be described with frequent reference to FIGS. 2 through 8B.

A repeater amplifier assembly is accessed in a contracted position (act 1001). For instance, with respect to FIGS. 6B and 8B, the guide rod 601 may be rotated in direction 610B until the repeater amplifier assembly 500 (in the case of FIG. 5) or the series 800A or 800B of repeater amplifier assemblies (in the case of FIGS. 8A and 8B) is contracted. The repeater amplifier assembly is then inserted in a repeater housing (act 1002). For instance, the contracted repeater amplifier assembly 500 (or the series 800A and 800B) may be inserted into repeater housing 201 and liner 401. A control is then actuated to cause the repeater amplifier assembly or series thereof to expand against the housing (act 1003). For instance, referring to FIG. 6A, the guide rod 601 may be rotated in direction 610A to cause the chassis 501 and 502 to press against the liner 401 inside the repeater housing 201. Similarly, the rotation of the shared guide rod may cause the series 800A or 800B to press against the liner 401 inside the repeater housing 201.

Figure 11:
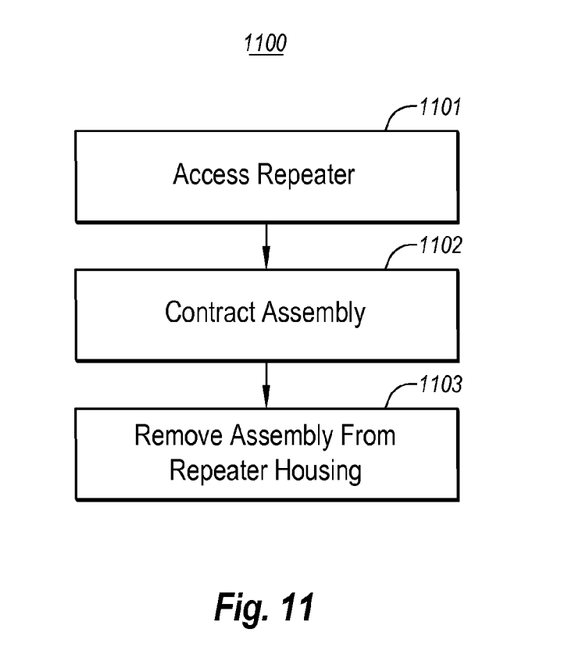
FIG. 11 illustrates a flowchart of a method for removing a repeater amplifier assembly from a repeater housing.

FIG. 11 illustrates a flowchart of a method 1100 for removing a repeater amplifier assembly from a repeater housing. A repeater housing is accessed (act 1101). For instance, in the case of a submarine optical repeater, the repeater housing may be accessed from the ocean floor. Then a control is actuated to cause the repeater amplifier assembly to contract (act 1102). For instance, in FIG. 6A, the guide rod 601 may be rotated in direction 610A to cause the chassis 501 and 502 to no longer press against the repeater housing 201. In the cases of the series 800A or 800B of repeater amplifiers assemblies, all of the chassis may disengage from the repeater housing 201. The repeater amplifier assembly or series thereof is then removed from the repeater housing (act 1102). For instance, the repeater amplifier assembly 500 or the series 800A or 800B may then be freely removed from the liner 401 and repeater housing 201.

Accordingly, the principles described herein describe a mechanism for expanding and contracting a repeater amplifier assembly so that the assembly can be more freely inserted and removed from the repeater housing.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A repeater amplifier assembly comprising:
a first chassis containing first optics and electronics;
a second chassis containing second optics and electronics; and
a size adjustment mechanism connecting the first and second chassis, and configured to adjust a size of the repeater amplifier assembly by reversibly adjusting a position of the first chassis with respect to the second chassis.

2. The repeater amplifier assembly in accordance with claim 1, wherein the size adjustment mechanism comprises a control that allows the repeater amplifier assembly to be reversibly positioned in an expanded position in which the first and second chassis are pushed outward from each other, or a contracted position in which the first and second chassis are pulled inward towards each other.

3. The repeater amplifier assembly in accordance with claim 1, wherein the first optic and electronics is for at least a first fiber pair.

4. The repeater amplifier assembly in accordance with claim 3, wherein the second optics and electronics is for at least a second fiber pair.

5. The repeater amplifier assembly in accordance with claim 1, wherein the first chassis has an outward facing surface that is shaped as a length-wise portion of a cylinder, and wherein the second chassis also has an outward facing surface that is also shaped as a length-wise portion of a cylinder.

6. The repeater amplifier assembly in accordance with claim 1, wherein the first chassis has an outward facing surface that is shaped as a length-wise half of a cylinder, and wherein the second chassis also has an outward facing surface that is also shaped as a length-wise half of a cylinder.

7. The repeater amplifier assembly in accordance with claim 1, wherein the size adjustment mechanism comprises a first mechanism that comprises:

a guide rod that is left hand threaded at a first portion, and right hand threaded at a second portion;
a first guide piece that is threaded on the left hand threaded portion;
a second guide piece that is threaded on the right hand threaded portion,
a mechanism for permitting the guide rod to be rotated with respect to the first and second guide pieces such that when the guide rod is rotated in a first direction, the first and second guide pieces move closer together along the guide rod, and such that when the guide rod is rotated in a second direction, the first and second guide pieces move further apart along the guide rod;
a first reaction block slidably coupled to the guide rod;
a second reaction block also slidably coupled to the threaded guide rod;
a resilient compression mechanism coupled to urge the first and second reaction blocks apart along the guide rod, wherein when the first and second guide pieces move closer together along the guide rod, the first and second guide pieces force the first and second reaction blocks to slide closer together along the guide rod and compress the resilient compression mechanism, and wherein when the first and second guide pieces move farther apart along the guide rod, the first and second guide pieces permit the resilient compression mechanism to push the first and second reaction blocks to be pushed further apart along the guide rod; and
a force transfer mechanism configured to transfer output pressure on the first and second chassis when the first and second reaction blocks are moved further apart along the guide rod, and configured pull inward on the first and second chassis when the first and second reaction blocks are moved closer to each other along the guide rod.

8. The repeater assembly in accordance with claim 7, wherein when the first and second guide pieces move closer together along the guide rod to beyond a certain point, the first and second reaction blocks are locked in position so that no externally applied rotational force need be applied to the guide rod in order to keep the first and second reaction blocks in place.

9. The repeater assembly in accordance with claim 7, wherein the force transfer mechanism comprises a first link arm coupled between the first reaction block and the first chassis.

10. The repeater assembly in accordance with claim 9, wherein the force transfer mechanism comprises a second link arm coupled between first reaction block and the second chassis.

11. The repeater assembly in accordance with claim 10, wherein the force transfer mechanism further comprises:
a third link arm coupled between second reaction block and the first chassis; and
a fourth link arm coupled between second reaction block and the second chassis.

12. The repeater amplifier assembly in accordance with claim 7, wherein the size adjustment mechanism comprises a second mechanism.

13. The repeater amplifier assembly in accordance with claim 12, wherein the guide rod is first guide rod, the resilient compression mechanism is a first resilient compression mechanism, and the force transfer mechanism is a first force transfer mechanism, the second mechanism comprising:
a second guide rod that is left hand threaded at a first portion, and right hand threaded at a second portion;

a third guide piece that is threaded on the left hand threaded portion;

a fourth guide piece that is threaded on the right hand threaded portion, a mechanism for permitting the second guide rod to be rotated with respect to the third and fourth guide pieces such that when the second guide rod is rotated in a first direction, the third and fourth guide pieces move closer together along the second guide rod, and such that when the second guide rod is rotated in a second direction, the third and fourth guide pieces move further apart along the second guide rod;

a third reaction block slidably coupled to the second guide rod;

a fourth reaction block also slidably coupled to the second guide rod;

a second resilient compression mechanism coupled to urge the third and fourth reaction blocks apart along the second guide rod, wherein when the third and fourth guide pieces move closer together along the second guide rod, the third and second guide pieces force the third and fourth reaction blocks to slide closer together along the second guide rod and compress the second resilient compression mechanism, and wherein when the third and fourth guide pieces move farther apart along the second guide rod, the third and forth guide pieces permit the second resilient compression mechanism to push the third and fourth reaction blocks to be pushed further apart along the second guide rod; and a second force transfer mechanism configured to transfer output pressure on the first and second chassis when the third and fourth reaction blocks are moved further apart along the second guide rod, and configured pull inward on the first and second chassis when the third and fourth reaction blocks are moved closer to each other along the second guide rod.

14. The repeater amplifier assembly in accordance with claim 7, wherein the resilient compression mechanism is a spring or series of disk springs positioned on the guide rod between the first and second reaction blocks.

15. The repeater amplifier assembly in accordance with claim 1, further comprising:

a third chassis containing third optics and electronics;

a fourth chassis containing fourth optics and electronics; and a second size adjustment mechanism connecting the third and fourth chassis, and configured to adjust a size of the repeater amplifier assembly by reversibly adjusting a position of the third chassis with respect to the fourth chassis.

16. The repeater amplifier assembly in accordance with claim 15, wherein the first and second size adjustment mechanisms are linked such that the position of the first chassis with respect to the second chassis occurs is reversibly adjusted while reversible adjusting the position of the third chassis with respect to the fourth chassis.

* * * * *